July 31, 1962

A. KATZ ET AL 3,047,843

MONITORING CIRCUITS

Filed Feb. 15, 1957

INVENTORS
ABRAHAM KATZ &
ANDREW RAUCHWERK
BY Morris␣␣␣
ATTORNEY

INVENTORS
ABRAHAM KATZ &
ANDREW RAUCHWERK
BY
ATTORNEY 3,047,843
Patented July 31, 1962

1

3,047,843
MONITORING CIRCUITS
Abraham Katz, Haddonfield, N.J., and Andrew Rauchwerk, Norristown, Pa., assignors to Radio Corporation of America, a corporation of Delaware
Filed Feb. 15, 1957, Ser. No. 640,518
8 Claims. (Cl. 340—174)

This invention relates to monitoring circuits, and particularly to circuits for monitoring the operation of magnetic core arrays.

Certain magnetic systems include arrays of magnetic cores arranged in coordinate groupings and having means for selecting desired ones of the cores. In memory and in switching applications, desired ones of the cores are selected by applying suitable excitations to the coordinate lines linked to the desired cores.

It is an object of the present invention to provide a monitoring circuit for determining when the desired ones, and not the others, of the coordinate lines are selected.

Another object of the present invention is to provide an indication whenever none, or undesired ones, of the coordinate lines are selected.

Still anther object of the present invention is to provide a monitoring circuit which provides an alarm signal whenever the coordinate lines actually selected differ from the desired coordinate lines.

According to the present invention, the array lines are coupled to a monitoring circuit. A desired array line is selected for receiving excitation signals in accordance with a coded selecting number. The monitoring circuit responds to excitation signals appearing on an array line by generating a coded number identifying that line. The coded identifying number is compared with the selecting number, and an alarm signal is provided when the compared numbers fail to correspond. The monitoring circuit also provides an alarm signal when none, or when more than one, of the array lines of any set are activated.

Figure 1:
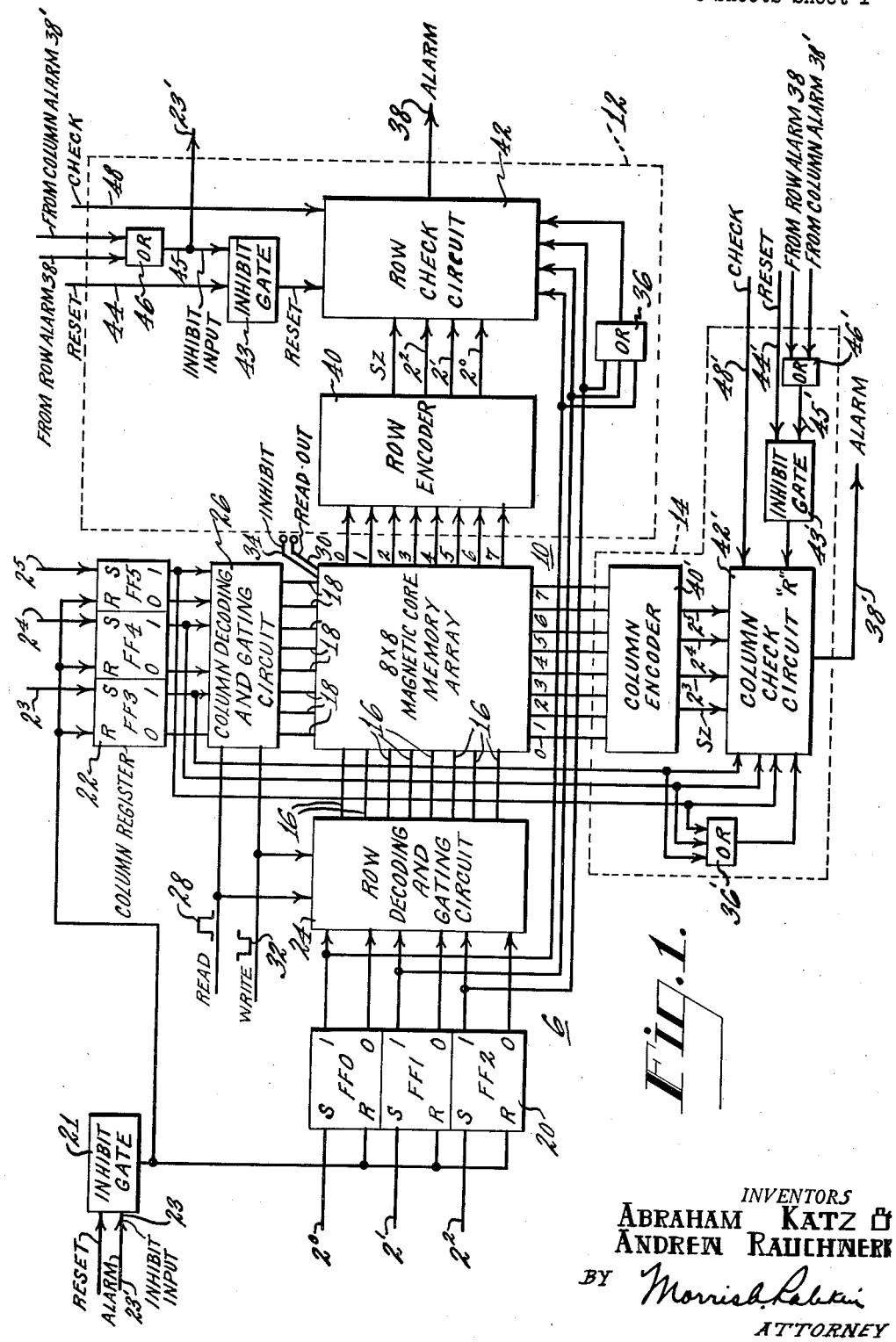
FIG. 1 is a schematic diagram of a two-dimensional memory system including a row and a column monitoring circuit according to the invention.

A memory system having a two-dimensional array 10 of memory cores arranged in eight rows and eight columns, and having auxiliary circuitry for operating the system, is shown in FIG. 1. The memory system of FIG. 1, except for the row and the column monitoring circuits 12 and 14, is known in the art. For example, in an article by William N. Papian, entitled "New Ferrite-Core Memory Uses Pulse Transformers," published in the March 1955 issue of Electronics, pages 194–197, there is described a magnetic core memory system having seventeen 64 x 64 arrays of magnetic cores. The system

2 shown in FIG. 1 herein is on a smaller scale than that described in the Papian article, and corresponds to one 8 x 8 portion of any one of the 64 x 64 arrays thereof. A row address number consisting of three binary digits of order $2^0$, $2^1$ and $2^2$ is used to select any desired one of the eight row lines 16 of the array 10. A column address number consisting of three binary digits of order $2^3$, $2^4$ and $2^5$ is used to select any desired one of the eight column lines 18 of the array 10. The row address number is set into the three flip-flops of the row address register 20, and the column address number is set into the three flip-flops of a column address register 22. The row register 20 controls the row decoding and gating circuitry 24 and the column register 22 controls the column decoding and gating circuitry 26 of the array 10. Reset signals are applied through a two-input inhibit circuit 21 to the reset inputs (R) of the row and column registers 20 and 22. The inhibit input 23 of the inhibit gate 21 is controlled by alarm signals applied to an alarm lead 23'.

When a positive read pulse 28 is applied to the row and column gating circuits 24 and 26, the information is read out of the memory core located at the intersection of the selected row and column lines 16 and 18 to the readout winding 30. When a negative write pulse 32 is applied to the row and column gating circuits 24 and 26, information is written into the memory core at the intersection of the selected row and column lines 16 and 18. One binary digit is written into the addressed memory core by applying an inhibit pulse to an inhibit winding 34 concurrently with the application of the write pulse 32 to the row and column lines 16 and 18. The other binary digit is written into the addressed memory core by withholding the inhibit pulse from the inhibit line 34 when write pulse 32 is applied to the row and column lines 16 and 18.

The eight row lines 16 of the array 10, each indicated by the decimal equivalent of its respective binary address, are connected respectively to a first group of eight inputs of the row monitoring circuit 12. The "1" output sides of the three flip-flops of the row register 20 are coupled respectively to three inputs of a second group of inputs of the row monitoring circuit 12. An alarm output is provide on an output lead 38 of the row monitoring circuit.

Within the row monitoring circuit 12, the first group of eight inputs are coupled to a row encoder circuit 40 which provides four separate outputs to a row check circuit 42 of the row monitoring circuit 12. Three outputs $2^0$, $2^1$ and $2^2$ of the row encoder 40 designate a binary number identifying the selected row line 16. A fourth signal, designated Sz, is produced by the row encoder 40 on a line Sz when the topmost row line 16, designated "0," is selected. The separate signal Sz is generated for the "0" row line 16 for reasons described more fully hereinafter. The second group of inputs to the row monitoring circuit 12 are applied to the row check circuit 42. The latter three inputs also are applied to the respective inputs of a three-input "or" circuit 36 whose output is connected to the row check circuit 42. Reset signals appearing on a reset line 44 are applied through a two-input inhibit gate 43 to the reset input (R) of the row check circuit 42. Alarm signals are applied to the inhibit input of the inhibit gate 43 over an inhibit lead 45. The inhibit lead 45 is connected to the output of a two-input "or" circuit 46 which has its two inputs connected respectively to the alarm outputs of the row and column monitoring circuits 12 and 14. The output of the "or" circuit 45 also is applied over inhibit lead 23' to the inhibit gate 21 of the row and column registers 20 and 22. The condition of the row check circuit 42 is determined during each memory cycle by a check pulse applied to a check line 48 of the row check circuit 42.

The column monitoring circuit 14 is arranged similarly to the row check circuit 12, and corresponding elements are designated in the drawing by like reference numerals with the addition of a prime.

Figure 2:
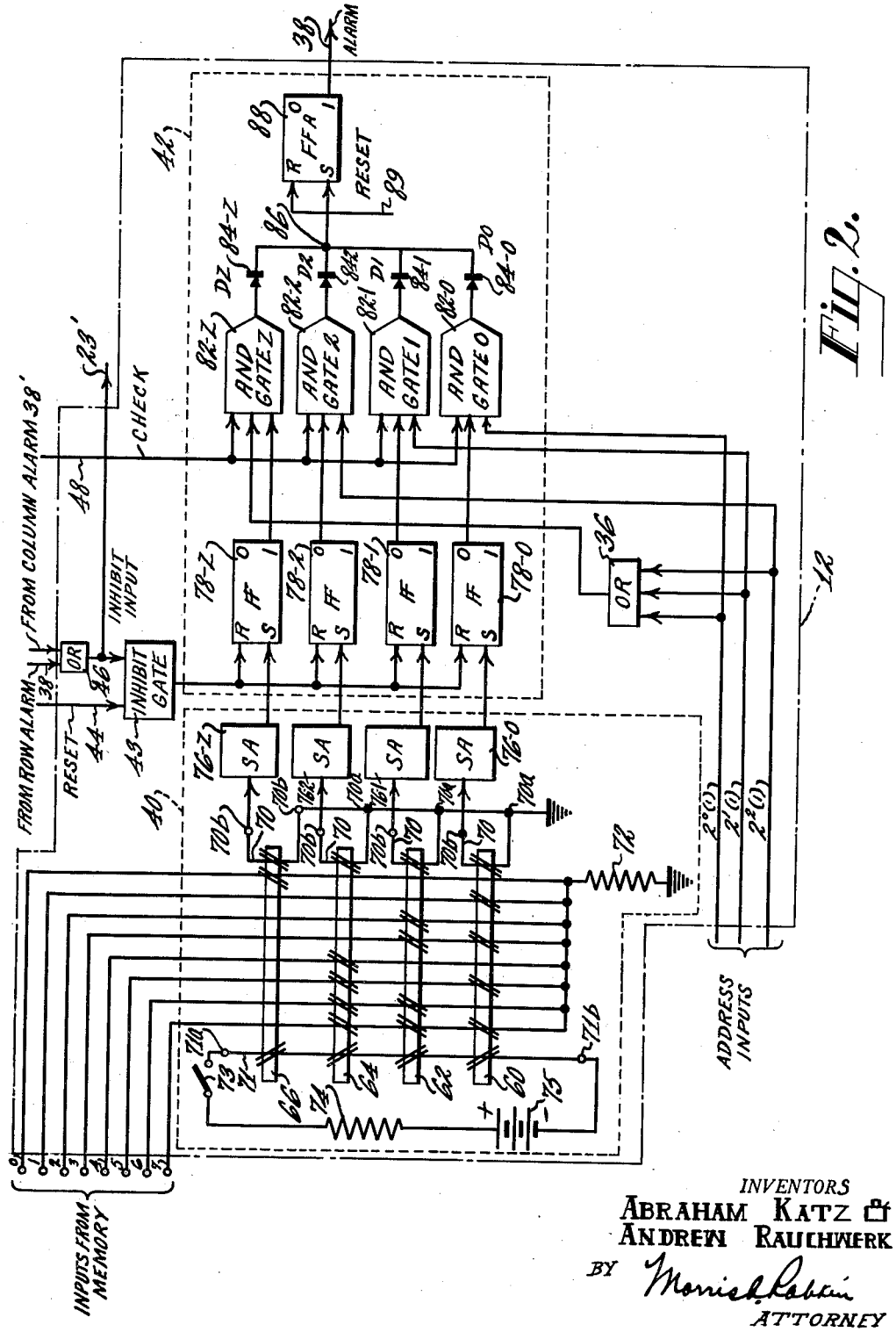
FIG. 2 is a schematic diagram of one of the monitoring circuits of FIG. 1.

FIG. 2 is a more detailed diagram of the row monitoring circuit 12. The row encoder 40 includes four separate magnetic cores 60, 62, 64 and 66 which are respectively used for generating the encoder output signals $2^0$, $2^1$, $2^2$ and $Sz$. The encoder cores may be similar in size and in magnetic characteristics to the cores used in the memory array of FIG. 1. The row lines 16 link the three bottom encoder cores 60, 62 and 64 in combinatorial fashion, according to a three-digit binary code. The "0" row line 16 links only the top encoder core 66. Each of the encoder cores is linked by a separate output or sensing winding 70. A restore line 71 links all of the cores of the encoder 40. Each of the row lines 16 is series-connected through a resistance element 72 to a source of common reference potential, indicated in the drawing by the conventional ground symbol. The common resistance element 72 corresponds to the 2-ohm resistor shown in the upper right-hand portion of FIG. 3 of the aforesaid Papian article.

The linkage of a row line 16 to an encoder core is indicated in FIG. 2 by short, slanted lines intersecting the cores and the row lines 16. One sense of linkage is indicated when the short lines are slanted from left to right in the downward direction, and the opposite sense of linkage of a line to a core is represented when the short lines are slanted from left to right in the upward direction. The row lines 16 and the output windings 70 link various encoder cores in the one sense, and the restore line 71 links all the encoder cores in the opposite sense. The row lines 16 link the encoded cores with a plurality of turns to insure that an encoder core receives sufficient magnetizing force to produce a change in the remanent state of the encoder core when coincident-current excitation is used in operating the memory system. One end terminal 71a of the restore line 71 is connected to the fixed terminal of a single-throw, single-pole switch 73. The movable arm of the switch 73 is connected through a current-limiting resistor 74 to the positive terminal of a source of voltage, such as the battery 75. The negative terminal of the battery 75 is connected to the other end terminal 71b of the restore line 71. One terminal 70a of each of the output windings 70 is connected to ground, and the other terminals 70b of the four output windings 70 are connected respectively to the inputs of four sensing amplifiers (SA) 76 designated 76–z, 76–2, 76–1 and 76–0, respectively. The outputs of the sensing sensing amplifiers 76 are connected respectively to the set input (S) of a different one of four check flip-flops (FF) 78, designated 78–z, 78–2, 78–1, and 78–0, respectively. The reset inputs (R) of the check flip-flops 78 are all connected to the output of the two-input inhibit gate 43. The check circuit is provided with a group of four, three-input "and" gates 82, designated 82–z, 82–2, 82–1, and 82–0, respectively. These "check" "and" gates 82 are used to compare the address of the desired row line 16 with the address of the row line 16 actually selected. The first inputs of the "and" gates 82–2, 82–1, and 82–0 are connected respectively to the "0" output side of the check flip-flops 78–2, 78–1, and 78–0. The first input of the check "and" gate 82–z is connected to the "1" output side of the check flip-flop 78–z. The output of the "or" circuit 36 is connected to the second input of the check "and"

gate 82–z. The three "1" outputs of the row register 20 (FIG. 1) are connected respectively to the second inputs of the other three check "and" gates 82–2, 82–1 and 82–0. The third inputs of all the check "and" gates 82 are connected to the check line 48. The four outputs of the check "and" gates 82 are connected in series respectively with four unilateral conducting devices, such as the four crystal diodes 84, designated 84–z, 84–2, 84–1 and 84–0, respectively, to a first junction 86. Each of the crystal diodes 84 is poled for a direction of easy current flow from the output of its corresponding "and" gate 82 to the first junction 86. The first junction 86 is connected to the set input "S" of an alarm flip-flop 88. The "1" output of the alarm flip-flop 88 is connected to the alarm output lead 38 of the row monitoring circuit 12.

In operation, each of the flip-flops of the system is in a reset condition and all of the cores of the row and column encoders 40 and 40' (FIG. 1) are magnetized in one of their two remanent states. The row and column address numbers, identifying the row and column lines 16 and 18 of the desired memory core, are set into the row and column registers 20 and 22, between times t0 and t1, as indicated by the single setting pulse 90, illustrated at line a of FIG. 3. The address numbers and the various timing signals required for operating the system may be supplied by any suitable device, such as a digital computer. Between times t2 and t3, a read pulse 28 is applied to the row and the column gating circuitry 24 and 26, as illustrated at line b of FIG. 3. During proper operation, the desired memory core of the array 10 provides an output signal on the readout winding 30 between the times t2 and t3, as indicated at line c of FIG. 3. When a binary "0" is read out of the desired memory core, the short-duration pulse, illustrated by the dotted voltage pulse 92', is generated in the readout winding 30 between the times t2 and t2'. When a binary 1 is read out of the desired memory core, a relatively longer-duration pulse, illustrated by the solid pulse 94, is generated in the readout winding 30.

The read current applied to the selected row line 16 also flows through the row encoder 40 and changes the remanent condition of each of the cores linked by the selected row line 16 from its initial state to the other state. Assume, for example, that the number 3 row line 16 (fourth from the top) is the row line selected by the row-decoding and gating circuit 24. The read current flowing in the number 3 row line 16 between the times t2 and t3 changes the remanent states of the bottom two encoder cores 60 and 62 (FIG. 2). The voltages induced in the output windings 70 by the flux changes produced in the cores 60 and 62 are of one polarity, as illustrated by the positive pulse 96 at line d of FIG. 3. The sensing amplifiers 76 connected to the output windings 70 are each arranged to block a positive pulse 96 from appearing at their outputs. The sensing amplifiers also discriminate against "noise" signals of amplitude less than a threshold value. Any suitable sensing amplifier circuit may be employed. Similarly, the read current flowing in the selected column line 18, FIG. 1, changes the remanent states of the cores of the column encoder 40' that are linked by the selected column line 18 from their initial to their other states.

Accordingly, during the read portion of the memory cycle, the selected row and column lines 16 and 18 are activated, and the information stored in the memory core at the intersection of the selected row and column lines is read out. Also, the cores of the row and column encoders 40 and 40' that are linked by the selected row and column lines 16 and 18 have their remanent states changed.

Figure 3:
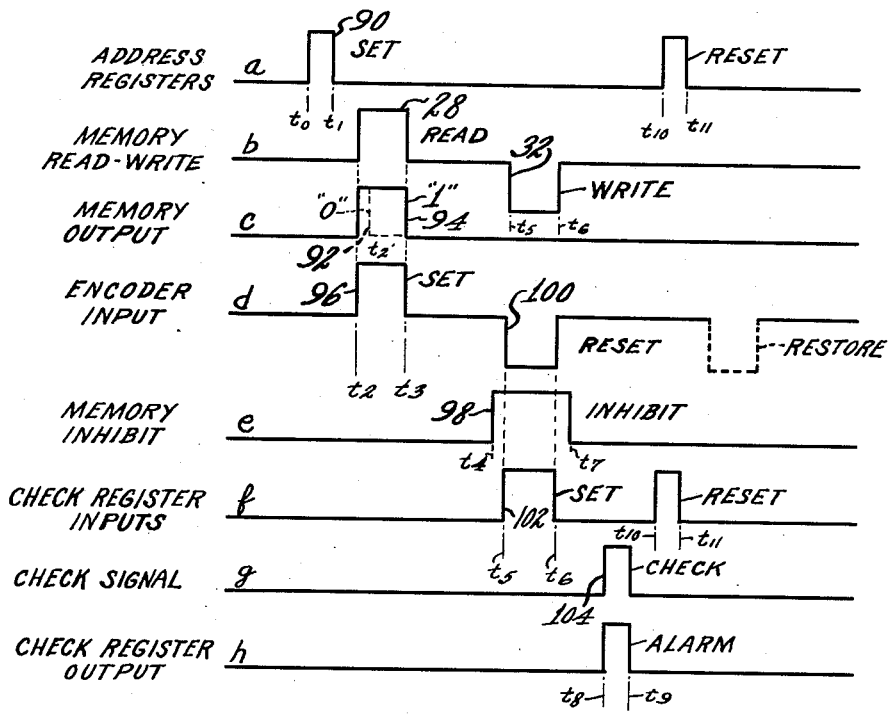
FIG. 3 is a timing diagram useful in explaining the operation of the monitoring circuit of FIG. 1.

During the write portion of the memory cycle, information is written into the addressed memory core of the array 10. Between times t4 and t7, an inhibit pulse is applied to the inhibit winding 34 if it is desired to write a binary "0" into the addressed memory core. A positive inhibit pulse 98 is indicated in FIG. 3 at line *e*. Between the times *t*5 and *t*6, a negative write pulse 32 is applied to the row and the column gating circuits 24 and 26, as indicated by the pulse 32 of line *b* of FIG. 3. The write current changes the remanent state of the addressed memory core unless an inhibit pulse 98 is concurrently applied to the inhibit winding 34. Again assuming proper operation, the write current flows in the number 3 row line 16 and changes the encoder cores 60 and 62 (FIG. 2) from their other to their initial remanent states. The flux changes produced in the cores 60 and 62 by the write current induce voltages of a polarity opposite that produced by the read current in their output windings 70. The voltages induced in the output windings 70 of the cores 60 and 62 between times *t*5 and *t*6 are indicated at line *d* of FIG. 3 by the single negative pulse 100. The sensing amplifiers 76–0 and 76–1 connected to the output windings 70 of the encoder cores 60, 62 respond to these induced voltages. The outputs of the sensing amplifiers 76–0 and 76–1 change the check flip-flops 78–0 and 78–1 to their set conditions. The other two check flip-flops 78–2 and 78–*z* remain in their reset condition. The positive output pulses of the sensing amplifiers 76 are illustrated at line *f* of FIG. 3 by the single positive pulse 102.

Similarly, the write current flowing in the selected column line 18 restores the changed ones of the cores of the column encoder 40′ to their initial states. The output voltages from the changed cores of the column encoder 40′ are used to set the corresponding ones of the column monitoring check flip-flops. Accordingly, during the write portion of the memory cycle, information is written into the addressed memory core, the cores of the row and column encoders 40 and 40′ are returned to their initial remanent states, and coded binary numbers identifying the selected row and column lines 16 and 18 are staticized in the check flip-flops 78 of the row and column monitoring circuits 12 and 14.

The "0" outputs of the check flip-flops 78–0 and 78–1 are low relative to their "1" outputs. Accordingly, the check "and" gates 82–0 and 82–1 are not enabled at their first inputs. The check "and" gate 82–2 is not enabled at its second input because the FF2 row register flip-flop 20 (FIG. 1) is reset, and its "1" output is relatively low compared to its "0" output. The check "and" gate 82–*z* is not enabled at its first input because the check flip-flop 78–*z* is in its reset condition. Accordingly, none of the check "and" gates 82 is enabled when the desired and the selected row lines 16 correspond to each other during the read and write portions of the memory cycle.

Between times *t*8 and *t*9, a check signal is applied to the check line 48 to interrogate the check "and" gates 82. The check signal is illustrated at line *g* of FIG. 3 by the positive pulse 104. No output is produced by any of the check "and" gates 82 between the times *t*8 and *t*9, and the alarm flip-flop 88 remains in its reset condition. Accordingly, the "1" output of the alarm flip-flop 88 appearing on the alarm lead 38 is relatively low. Therefore, the inhibit gates 43 and 43′ of the row and column monitoring circuits 12 and 14 are each enabled because the level appearing on the inhibit lead 45 between times *t*8 and *t*9 is relatively low. Also, the inhibit gate 21 of the row and column registers 20 and 22 is enabled due to the low-level signal applied to its inhibit input 23 by the output of the "or" circuit 46 of the row monitoring circuit 12.

Between times *t*10 and *t*11, a reset signal is applied to the enabled inhibit gates 43 and 43′ and is passed therethrough to the reset inputs of each of the check flip-flops 78 of the row and column encoders 40 and 40′. A reset signal also is applied to the inhibit gate 21 of the row and column registers 20 and 22 between times *t*10 and *t*11 and is passed therethrough to the reset inputs of the row and column registers 20 and 22. The memory system of FIG. 1 is now in its initial condition and a new memory cycle can be initiated.

Assume, now, that during the new memory cycle, it is desired to select the number 4 row line 16 (fifth from the top), but that, due to faulty operation, the number 3 row line 16 actually is selected. In such case, the check flip-flops 78–0 and 78–1 of the row monitoring circuit 12 are changed to their set conditions during the write portion of the memory cycle, as before. However, the check "and" gate 82–2 is now enabled at its first and second inputs, because the "1" output of the FF2 flip-flop of the register 20 (FIG. 1) is high relative to its "0" output, and because the "0" output of the check flip-flop 78–2 is high relative to its "1" output. Accordingly, between times *t*8 and *t*9, the check signal 104 is passed by the enabled check "and" gate 82–2 and through the crystal diode D2 to the set input of the alarm flip-flop 88. The "1" output of the alarm flip-flop 88, appearing on the alarm output 38, is therefore relatively high. The inhibit gates 43 and 43′ of the row and column monitoring circuits 12 and 14 are not enabled because of the relatively high-level signal applied to their inhibit inputs. Also, the inhibit gate 21 of the row and column registers 20 and 22 is not enabled because of the relatively high-level signal applied to its inhibit input over inhibit line 23′. The reset pulse applied between times *t*10 and *t*11 is, therefore, blocked by each of the inhibit gates 43, 43′ and 21, and each of the registers remains in the condition assumed by it during the read and write portions of the memory cycle. The alarm signal appearing on the output 38 of the row monitoring circuit 12 may be used to actuate any suitable circuit for stopping further memory operation. Also, the alarm signal appearing on the alarm output 38 may be used to actuate an indicating device on the console panel of the computer system. By thus maintaining the various registers in the conditions assumed by them during a faulty memory cycle, the operator maintaining the equipment can readily locate the area of the memory system that caused the faulty operation. After the fault is corrected, the various registers may be reset, for example, by a manual reset signal not shown in the drawing.

If none of the row lines 16 were selected during a memory operation, all the cores of the row encoder 40 remain in their initial remanent states and all the flip-flops 78 of the check circuit 42 remain reset. Accordingly, all of the check "and" gates 82–0, 82–1, and 82–2 of the check circuit 42 are enabled at their first input connected to the check flip-flops 78. Also, the "1" outputs of one or more of the flip-flops of the row register 20 are high relative to their "0" outputs, except for the special case of the selection of the "0" row line 16, described more fully hereinafter. Thus, one or more of the check "and" gates 82–0, 82–1, and 82–2 are also enabled at their second inputs connected to the row register 20. The check signal is then passed through the enabled one or more of the check "and" gates 82 to the set input of the alarm flip-flop 88.

The separate encoder core 66 is used in each of the row and column encoders 40 and 40′ to sense the selection of zero (0) row and column lines 16 and 18. Thus, assume for example, that the zero row line 16 is desired to be selected during a memory cycle. The address number (000) of the zero row line 16 is set into the row register 20, and each of the row register flip-flops is in its reset condition. Thus, none of the check "and" gates 82 are enabled at their second inputs connected to the row register 20. Upon selection of the zero row line 16 during the memory cycle, the zero line core 66 is changed between its remanent states and the connected check flip-flop 78–*z* is changed to its set condition, thereby enabling the check "and" gate 82–*z* at its first input. However, the check signal is blocked by the check "and" gate 82–*z* because this gate is not enabled at its second input connected to the output of the "or" circuit 36. If, however, the zero row line 16 is improperly selected, then one or more of the flip-flops of the row register 20 is in its set condition. Accordingly, the "or" gate 36 of the row monitoring circuit 12 provides a relatively high output signal to enable the check "and" gate 82-z at its second input. During the write portion of the memory cycle, the check flip-flop 82-z is changed to its set condition, thereby enabling the check "and" gate 82-z at its first input. Accordingly, the check signal now is passed by the check "and" gate 82-z to set the alarm flip-flop 88. The relatively high "1" output of the alarm flip-flop 88 appearing on alarm lead 38 indicates faulty operation of the memory.

If the read portion of the memory cycle proceeds correctly, but a fault occurs during the write portion of the memory cycle, all of the check circuit flip-flops 78 remain in their reset conditions. The check flip-flops 78 remain reset because the sensing amplifiers 76 pass only the voltage pulses produced in the output windings 70 when the encoder cores are returned to their initial remanent states. Accordingly, one or more of the check "and" gates 82 are enabled at both their first and second inputs, and the check signal is passed by these enabled check "and" gates 82 to set the alarm flip-flop 88. After the faulty condition is corrected, the restore switch 73 may be momentarily closed and then opened to restore the cores of the encoder 40 to their initial remanent states. Thus, the row and the column monitoring circuits 12 and 14 serve to monitor all phases of the memory operation.

Figure 4:
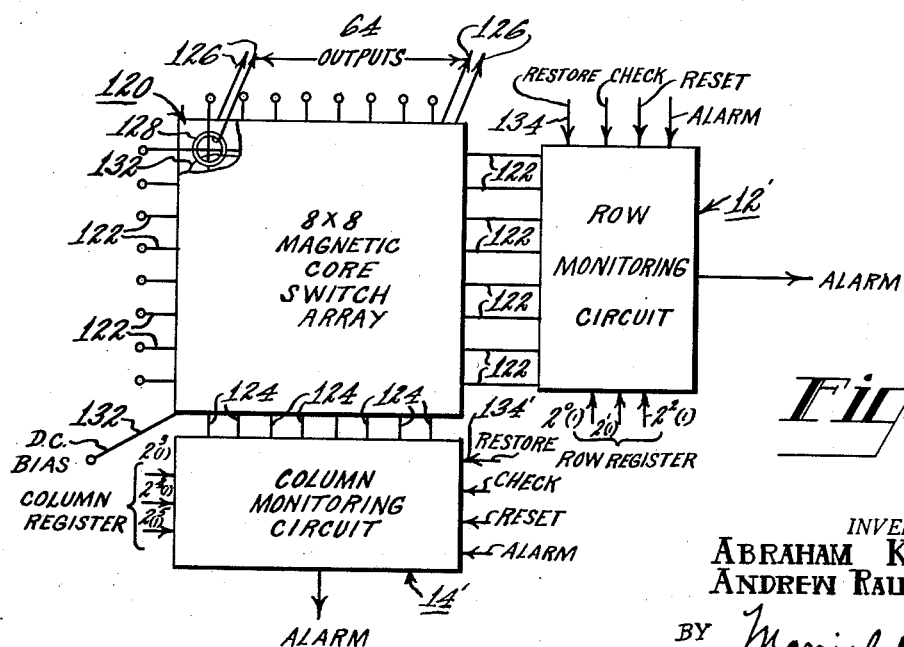
FIG. 4 is a schematic diagram of a monitoring circuit according to the invention, used in a magnetic switching system.

The monitoring circuits of the present invention may be used to advantage in magnetic-core switching applications; for example, the invention is embodied in the arrangement of FIG. 4. Examples of known magnetic core switches include the D.C. (direct current) biased switches and anticoincidence-type switches. The D.C. bias switching system of FIG. 4 includes an 8 x 8 array 120 of switch cores. The array 120 is partially broken away at the upper left-hand corner to show a single switch core 128 and the manner of linking the row and column lines 122 and 124, and the D.C. bias coil 132 to that core 128. Any one switch core 128 has both the row and column coils 122 and 124 linked thereto in the same one sense, and the bias coil 132 linked thereto in the opposite sense. The eight row lines 122 are respectively coupled to eight inputs of a row monitoring circuit 12', and the eight column lines 124 are coupled respectively to eight inputs of a column monitoring circuit 14'. The row and column monitoring circuits 12' and 14' are the same as those described in connection with FIG. 1 except that each monitoring circuit 12' and 14' has an additional restore input 134 and 134', respectively.

In the operation of the switch array 120, D.C. bias current maintains each switch core saturated in one of its two directions of magnetization. A desired switch core 128 is changed to the opposite direction of magnetization upon the concurrent application of selecting currents to the row and column lines 122 and 124 intersecting in the desired switch core 128. The flux change in the desired switch core 128 induces an output of one polarity in the output winding 126 linked thereto. The row and column currents flowing in the row and column lines 122 and 124 change the remanent states of the linked encoder cores of the row and column monitoring circuits 12' and 14', as described for the system of FIG. 1. After the row and column selecting currents are removed from the row and column lines 122 and 124 of the desired switch core 128, the D.C. bias current returns the desired switch core 128 to saturation in its initial direction of magnetization. The flux change in the desired switch core 128 induces an opposite-polarity output in its coupled output winding 126. The one and the opposite-polarity outputs of the switch 120 may be used in known fashion as the read and write currents for a magnetic core memory.

The row and column lines 122 and 124, however, are each open-circuited when the opposite-polarity output is provided by the switch 120. Therefore, no current is produced in the row and column lines 122 and 124 to automatically restore the changed encoder cores to their initial remanent states, as is done in the system of FIG. 1. After the row and column selecting currents are terminated, a restore signal is applied to the external restore lines 134 and 134' of the row and column monitoring circuits 12' and 14'. The external restore signal returns the changed encoder cores to their initial remanent states, thereby producing output signals which set the coupled check circuit flip-flops. A later check signal then produces an alarm output signal from the row or column monitoring circuits 12' and 14' whenever the desired and selected row and column lines 122 and 124 do not correspond.

Figure 5:
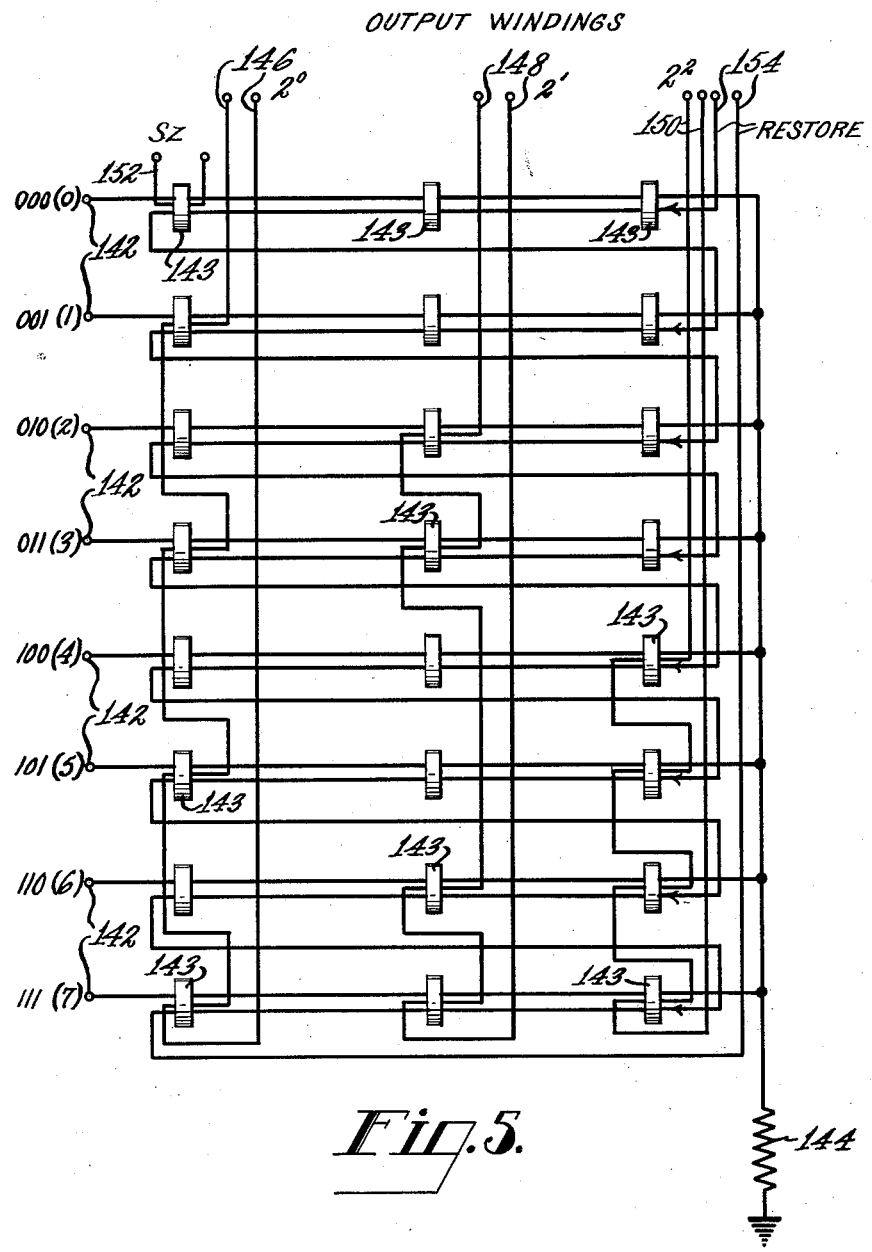
FIG. 5 is a schematic diagram of one form of encoding circuit useful in the monitoring systems according to the present invention.

A magnetic core encoder circuit which provides a constant load impedance at the output of the monitored array is shown in FIG. 5. The encoder of FIG. 5 may be used to perform the functions of the encoder 40 of FIG. 1 or the encoder of the system of FIG. 4. The encoder of FIG. 5 has twenty-four magnetic cores 143 arranged in eight rows and three columns. The eight coordinate lines 142 of the monitored 8 x 8 array respectively link the rows of encoder scores 143. Each of the array lines 142 is connected to ground through a common resistor 144 at its terminal remote from that connected to its corresponding coordinate line 142. Each of the array lines 142 is designated by a different one of eight binary numbers with the equivalent decimal number being given in parentheses. Three sensing windings 146, 148 and 150 are linked to the encoder cores 143 in combinatorial fashion to provide, respectively, binary output signals of order $2^0$, $2^1$, and $2^2$. The first sensing winding 146 is linked to odd-numbered ones of the cores 143 in the left-hand column. The second sensing winding 148 is linked to alternate pairs of the encoder cores 143 of the middle column, and the third sensing winding 150 is linked to the lower half of the encoder cores 143 of the right-hand column. A fourth sensing winding 152 is linked to the encoder core 143 of the first row and the first column to provide the output signal Sz when the 0 coordinate line 142 is selected. The array lines 142 may link the encoder cores 143 with a plurality of turns although, for convenience of drawing, only a single turn is shown. A restore coil 154 links all the cores 143 of the encoder.

The operation of the encoder of FIG. 5 in a monitoring system is the same as that described for the encoder in the system of FIGS. 1 and 2 except that each time an array line is activated, three encoder cores 143 are selected. Thus, the encoder of FIG. 5 always presents a constant load to the array driver sources no matter which of the coordinate lines 142 are selected.

Assume, for example, that the coordinate line 142 of address 011 is selected. In such case, the selecting current changes the three encoder cores 143 of the fourth row from the top from their initial to their other remanent states, thereby inducing a signal in the $2^0$ and $2^1$ sensing windings 146 and 148. No signal is induced in the $2^2$ or Sz sensing windings 150 or 152 because neither of these windings link the cores 143 of the fourth row. Similarly, when any other of the coordinate lines 142 are selected, signals are induced in one or more of the sensing windings 146, 148, 150 or 152 to identify the activated one of the coordinate lines 142.

The encoder circuit of FIG. 5 is advantageous when used in a monitoring system for an anticoincidence-type magnetic core switch. An anticoincidence-type magnetic core is arranged similarly to the switch 120 of FIG. 4 except that a D.C. bias coil 132 is not employed. The restore input 134 of a monitoring circuit is connected to the restore coil 154 of FIG. 5. In operation, selection of a desired switch core 128 (FIG. 4) is carried out by applying an inhibit current to all the row lines 122 except that linked to the desired switch core 128. Concurrently with the application of the inhibit currents to the row lines 122, a drive current is applied to that column winding 124 (FIG. 4) linking the desired switch core 128. The row line inhibit currents operate to prevent the column drive current from changing the remanent state of any switch core 128 except that of desired switch core. The column drive current also changes the row of encoder cores of the column monitoring circuit 14' that are linked by the selected column line 124. During the selection of the desired switch core 128, a restore current is applied to the restore input 134 of the row monitoring circuit 12'. Each of the inhibit currents applied to the row lines 122 is in a direction to drive any row encoder core 143 (FIG. 5) receiving an inhibit excitation from remanence in one state to saturation in the same one state. The restore current flowing in the restore coil 154 is in a direction to change each encoder core 143 from remanence in its initial state to saturation in the other state. However, only those cores of the row of encoder cores that are linked by the selected row line 122 can change their states because all the other encoder cores 143 are inhibited by the row inhibit currents. The operation of the system of FIG. 4 with an anticoincidence-type switch is otherwise similar to that described for D.C. biased switch. Thus, during the write portion of the memory cycle, a restore signal is applied to the restore input 134' of the column monitoring circuit to return the changed encoder cores to their initial remanent states. Another restore current also is applied to the restore input 134 of the row monitoring circuit 12' in a direction to return the changed encoder cores to their initial remanent states.

There have been described herein circuits for monitoring the operation of magnetic core systems. The monitoring circuits of the invention monitor the various phases of operation of a magnetic core system. Upon detection of a fault, further operation of the monitored system is stopped, and the information staticized in the various registers of the monitoring circuits may be used as an aid in quickly locating the faulty portion of the system.

The monitoring circuits described herein may be used with magnetic memory systems, and magnetic switching systems of various types.

What is claimed is:

1. In combination with a magnetic core array having a set of array lines and having means for selecting a desired line in accordance with a first group of coded signals, a monitoring circuit comprising means generating a second group of coded signals, and a check circuit, said generating means including a plurality of monitor cores each linked by at least one of said array lines of said set, and sensing windings linked to said monitor cores, said check circuit being connected to said sensing windings and being responsive to both said first and second groups of coded signals.

2. A system for monitoring the operation of a magnetic core array having a plurality of sets of array lines and having means for selecting a desired line in each of said sets in accordance with separate first groups of coded signals respectively, said system comprising a separate monitoring circuit connected to each set of said lines, each said monitoring circuit including a plurality of monitor cores each having two remanent states different ones of said monitor cores being linked by different lines of said connected set, sensing windings linking said monitor cores for generating another group of coded signals, a separate check circuit for each separate monitoring circuit responsive to the associated other group of coded signals, and means for applying each of said separate first groups of coded signals to the check circuit associated with the corresponding set of array lines, each said check circuit producing an alarm output signal when none of said sensing windings of its said connected monitoring circuit has signals induced therein during operation of said array.

3. A monitoring system for use with a magnetic core array having a plurality of array lines and having means for selecting a desired line in accordance with a first group of binary coded signals, said monitoring system comprising a plurality of monitor cores coupled to said array lines, sensing windings each linking different groups of said monitor cores according to a combinatorial arrangement for generating a second group of binary coded signals, a check circuit having inputs and an output, said sensing windings being coupled respectively to ones of said check circuit inputs, and means for applying said first group of signals to others of said check circuit inputs, said check circuit providing an alarm signal on its output when said first and second groups of binary coded signals do not correspond.

4. A monitoring system for use with a magnetic core array having a plurality of array lines and having means for selecting a desired line in accordance with a first group of coded signals, said monitoring system comprising a plurality of monitor cores coupled to said array lines, sensing windings each linking different groups of said monitor cores according to a combinatorial arrangement, for generating different coded groups of other signals, each coded group of other signals designating a different line of said plurality of array lines, and a check circuit for comparing said first and other groups of coded signals and having inputs and an output, said sensing windings being coupled respectively to ones of said check circuit inputs, and means for applying said first group of coded signals to others of said check circuit inputs, said check circuit providing an alarm signal on its output when no signals are applied to said ones of said inputs during operation of said magnetic core array.

5. In combination with a magnetic core array having a set of array lines and having means for selecting a desired line in accordance with a first group of coded signals, a monitoring circuit comprising a plurality of monitor cores, different ones of said monitor cores being linked by different array lines of said set, sensing windings linked to said monitor cores, and a check circuit connected to said sensing windings, said check circuit including a separate flip-flop for each said sensing winding, and a separate gating circuit for each said flip-flop, means for applying said first group of coded signals to the gating circuits of said check circuit and means for applying a check signal to all said gating circuits.

6. A monitoring circuit for a magnetic core array having sets of coordinate lines linking said array cores and having means for selecting a desired line of one set in accordance with a first group of coded signals, said monitoring circuit comprising means coupled to said coordinate lines of one of said sets for generating different coded groups of other signals, each coded group of other signals designating a different line of said one set, means for comparing said first and said other groups of said coded signals and for furnishing an output signal when said groups of coded signals do not correspond, means for furnishing an output signal when none of said coordinate lines are selected, and means for furnishing an output signal when more than one of said coordinate lines are selected.

7. In combination with a magnetic core array having a set of array lines, a monitoring circuit comprising a plurality of monitor cores, different ones of said monitor cores being linked by different array lines of said set, sensing windings each linking a different group of said monitor cores, and a check circuit comprising a different flip-flop circuit connected to each said sensing winding, and a plurality of "and" gate circuits, each having inputs, each said "and" gate circuit having one of said inputs connected to a different one of said flip-flop circuits, means for selecting a desired one of said array lines in accordance with a first group of coded signals, means for applying said first group of coded signals respectively to second inputs of said "and" gate circuits, and means for applying a check signal to a third input of all said "and" gate circuits, said check signal being passed by one or more of said "and" gate circuits jointly under the control of signals from said check circuit flip-flops and said first group of coded signals.

8. A monitoring circuit for a magnetic core array comprising sets of coordinate lines linking said array cores, means for selecting a desired line of one set in accordance with a first group of coded signals, means coupled to said coordinate lines of said one of said sets for generating different coded groups of other signals, each said coded group of other signals designating a different line of said one set, a check circuit, and means for applying said first group and said different groups of coded signals to said check circuit.

References Cited in the file of this patent

UNITED STATES PATENTS

| | | |
|---|---|---|
| 2,648,829 | Ayres et al. | Aug. 11, 1953 |
| 2,691,152 | Stuart-Williams | Oct. 5, 1954 |
| 2,691,156 | Saltz et al. | Oct. 5, 1954 |
| 2,700,759 | Ogle et al. | Jan. 25, 1955 |
| 2,734,182 | Rajchman | Feb. 7, 1956 |
| 2,734,184 | Rajchman | Feb. 7, 1956 |
| 2,769,971 | Bashe | Nov. 6, 1956 |
| 2,809,367 | Stuart-Williams | Oct. 8, 1957 |
| 2,904,781 | Katz | Sept. 15, 1959 |